United States Patent
Gmurowski et al.

(10) Patent No.: US 6,571,660 B2
(45) Date of Patent: Jun. 3, 2003

(54) ADJUSTABLE PEDAL ASSEMBLY

(75) Inventors: Waldemar Wawrzyniec Gmurowski, Sterling Heights, MI (US); Brian Norman Orr, Chesterfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 12 days.

(21) Appl. No.: 09/836,912

(22) Filed: Apr. 17, 2001

(65) Prior Publication Data

US 2002/0148322 A1 Oct. 17, 2002

(51) Int. Cl.$^7$ .................................................. G05G 1/14
(52) U.S. Cl. ........................................... 74/512; 74/560
(58) Field of Search ........................... 74/512, 513, 522, 74/560, 561, 562

(56) References Cited

U.S. PATENT DOCUMENTS

| | | | | |
|---|---|---|---|---|
| 5,078,024 A | * | 1/1992 | Cicotte et al. ................. | 74/512 |
| 5,460,061 A | * | 10/1995 | Redding et al. ............... | 74/512 |
| 5,855,143 A | | 1/1999 | Ewing | |
| 5,964,125 A | | 10/1999 | Rixon et al. | |
| 5,996,438 A | * | 12/1999 | Elton .......................... | 74/512 |
| 6,289,761 B1 | | 9/2001 | Reynolds et al. | |
| 6,367,348 B1 | * | 4/2002 | Toelke et al. ................. | 74/512 |
| 6,367,349 B1 | * | 4/2002 | Allen et al. .................... | 74/512 |
| 2002/0078782 A1 | * | 6/2002 | Flynn ........................... | 74/512 |
| 2002/0078786 A1 | * | 6/2002 | Zhang et al. ................. | 74/512 |

FOREIGN PATENT DOCUMENTS

| | | |
|---|---|---|
| EP | 0353958 | 2/1990 |
| JP | 63004312 | 1/1988 |
| WO | 9013862 | 11/1990 |

* cited by examiner

*Primary Examiner*—David Fenstermacher
(74) *Attorney, Agent, or Firm*—Kathryn A. Marra

(57) ABSTRACT

An adjustable pedal assembly includes a support structure adapted to connect to a vehicle, with the support structure defining first and second slots arranged in a spaced-apart manner. A pedal assembly is disposed adjacent the support structure, where the pedal assembly includes a pedal. First and second pins extend from the pedal assembly through the first and second slots whereby the pedal assembly is supported for sliding movement on the support structure along the slots. A linear actuator is interconnected with the pedal assembly for sliding the pedal assembly to a desired position along the support structure. The invention may be adapted for use in connection with brake pedals, clutch pedals, and accelerator pedals. In the case of accelerator pedals, the invention can be adapted for use with conventional pedals as well as electronic throttle control pedals.

14 Claims, 4 Drawing Sheets

ADJUSTABLE PEDAL ASSEMBLY

TECHNICAL FIELD OF THE INVENTION

The subject invention relates to adjustable pedal assemblies for vehicles, and more particularly to assemblies for adjusting the location of a brake, accelerator, or clutch pedal.

BACKGROUND OF THE INVENTION

Persons skilled in the art of vehicle pedals know that a pedal's location may be adjusted to accommodate drivers of different sizes. For example, a driver may desire to move the brake, clutch, and accelerator pedals closer if the driver has relatively short legs. Various ways have already been devised for moving pedals fore and aft with respect to the vehicle and the driver.

For example, U.S. Pat. No. 5,964,125 discloses an adjustable pedal system that moves the pedals fore and aft in a horizontal linear fashion on a tubular shaft. This type of adjustment works well. But the tubular shaft intrudes into the driver's space unnecessarily, and so the packaging of this arrangement in the vehicle leaves room for improvement. Also, the ideal ergonomic movement for a pedal pad as its position is adjusted is not necessarily along a horizontal line. The pedal pad should also move downwardly somewhat as it moves aft so that shorter drivers can have the same ergonomic advantage on the pedal that taller drivers have.

Another type of prior art adjustable pedal assembly is shown in U.S. Pat. No. 5,855,143. This system differs from the system shown in U.S. Pat. No. 5,964,125 in that it relies on an arrangement of pivoting linkages to adjust pedal location rather than a tubular shaft. This system also works reasonably well. But because it relies on a series of pivoting links, it is unduly complicated. Also, the links can loosen over time and rattle during vehicle operation.

The pedal art needs a simpler design that provides an appropriate ergonomic pedal orientation throughout the travel of the pedal. The art also needs a design that makes better use of space around the vehicle fire wall so that the adjustment assembly does not intrude on the space of the driver.

SUMMARY OF THE INVENTION AND ADVANTAGES

An adjustable pedal assembly for a vehicle includes a support structure adapted to connect to the vehicle, with the support structure defining first and second slots arranged in a spaced-apart manner. A pedal assembly is disposed adjacent the support structure, where the pedal assembly includes a pedal. First and second pins extend from the pedal assembly through the first and second slots whereby the pedal assembly is supported for sliding movement on the support structure along the slots. A linear actuator is interconnected with the pedal assembly for sliding the pedal assembly to a desired position along the support structure.

This invention is simple, having fewer parts than most prior art designs. It can generate a variety of pedal trajectories without the use of multiple linkages. Further, the invention makes better use of empty space adjacent the fire wall so that it does not intrude into the driver's space. It requires no change to any existing location of the push rod, cable, or pivots, and can be interchangeable with a conventional pedal assembly.

FIGURES IN THE DRAWINGS

The present invention will now be described, by way of example, with reference to the accompanying drawings, in which.

DESCRIPTION OF THE PREFERRED EMBODIMENT

Figure 1:
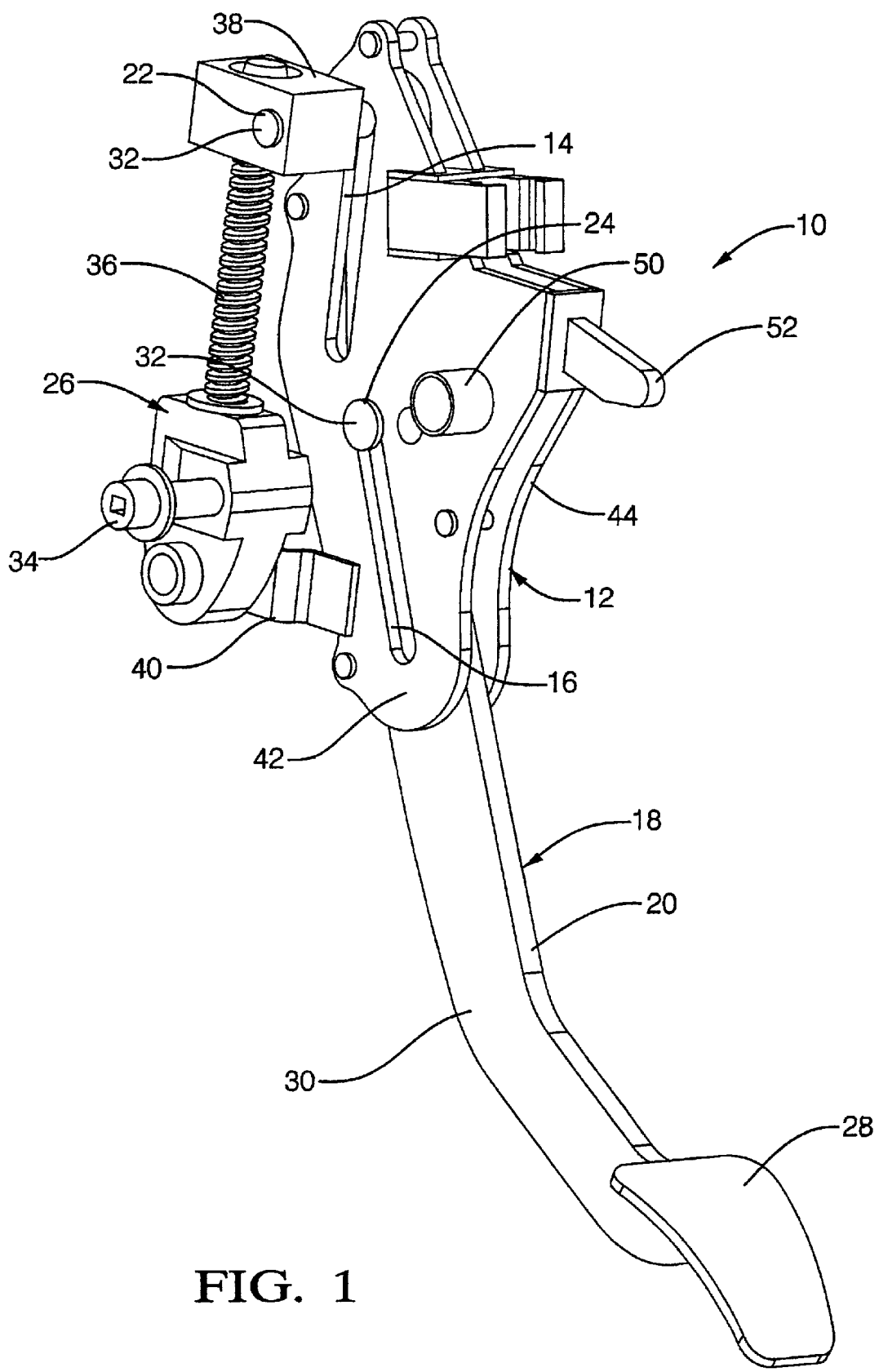
FIG. 1 is a perspective view of one embodiment of the subject invention.

The present invention will now be described, by way of example, with reference to the accompanying drawings in which an adjustable pedal assembly is generally shown at 10.

According to the most general conception of the invention, the assembly 10 includes a support structure generally indicated at 12 adapted to connect to the vehicle (not shown), with the support structure 12 defining first and second slots 14, 16 arranged in a spaced-apart manner. A pedal assembly generally indicated at 18 is disposed adjacent the support structure 12, where the pedal assembly 18 includes at least a pedal 20. First and second pins 22, 24 extend from the pedal assembly 18 through the first and second slots 14, 16 whereby the pedal assembly 18 is supported for sliding movement on the support structure 12 along the slots 14, 16. A linear actuator generally indicated at 26 is interconnected with the pedal assembly 18 for sliding the pedal assembly to a desired position along the support structure 12. The invention may be adapted for use in connection with brake pedals, clutch pedals, and accelerator pedals. In the case of accelerator pedals, the invention 10 can be adapted for use with conventional pedals as well as electronic throttle control pedals.

Figure 2:
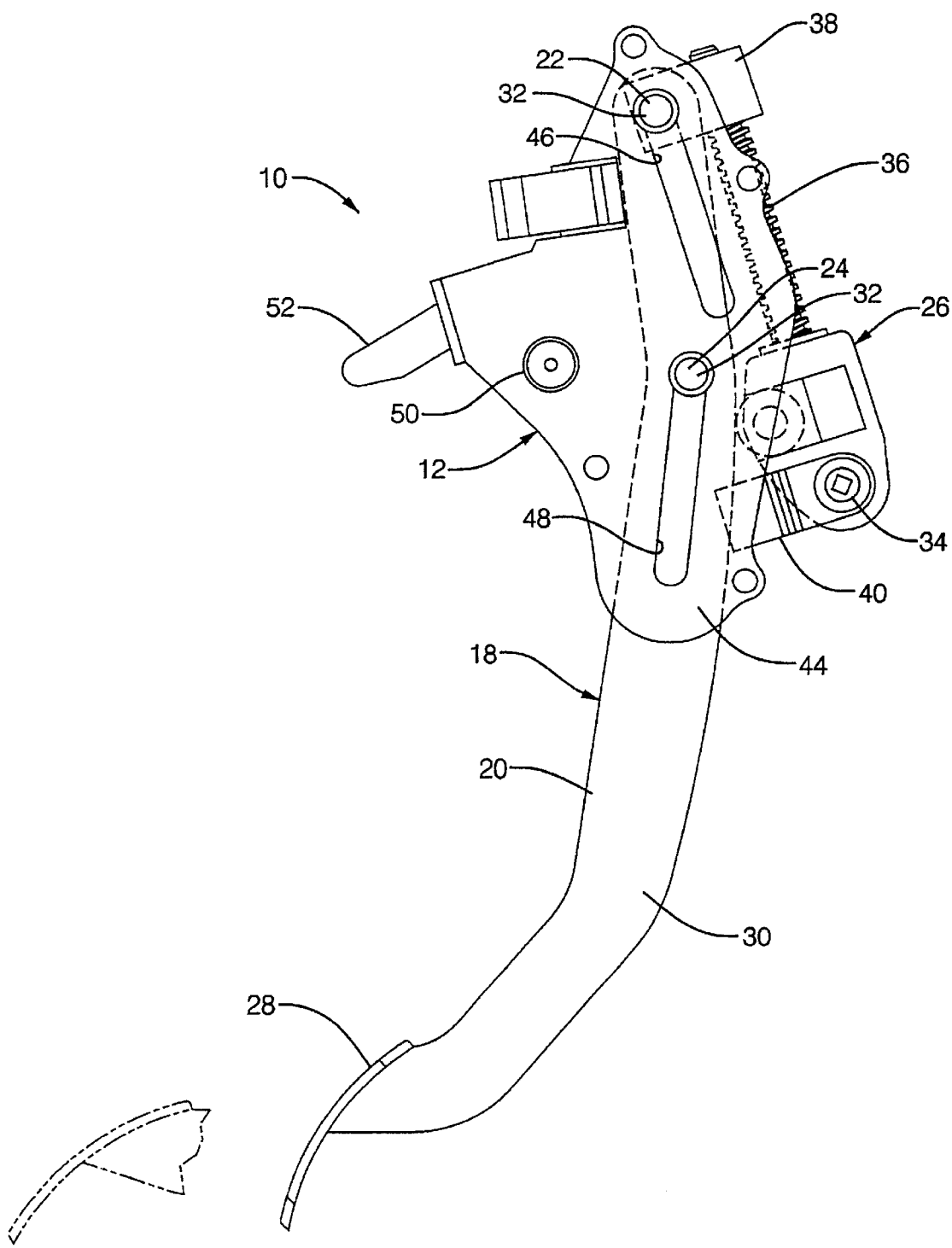
FIG. 2 is a side view of the embodiment shown in FIG. 1.
Figure 3:
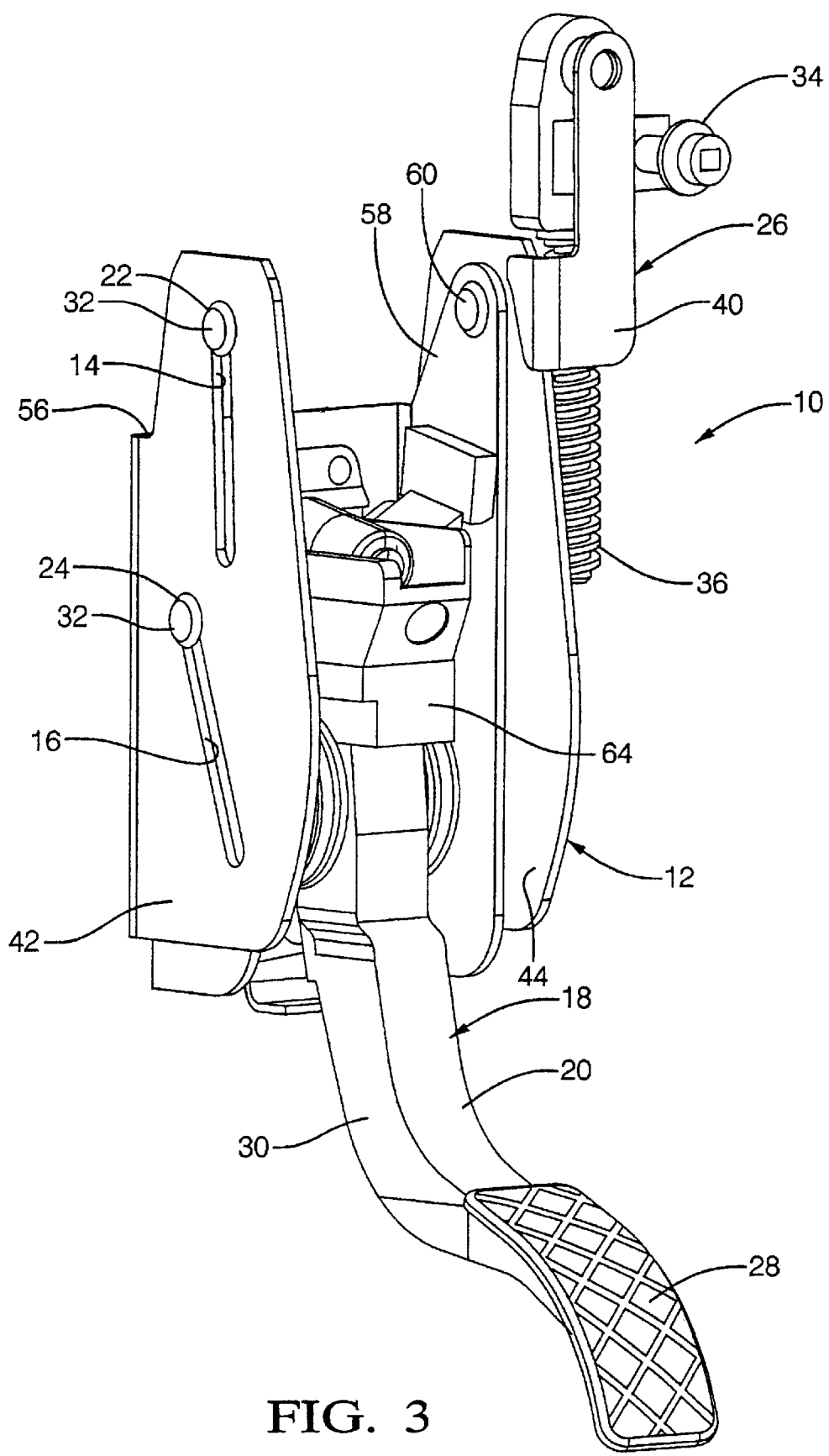
FIG. 3 is a perspective view of a second embodiment of the subject invention.
Figure 4:
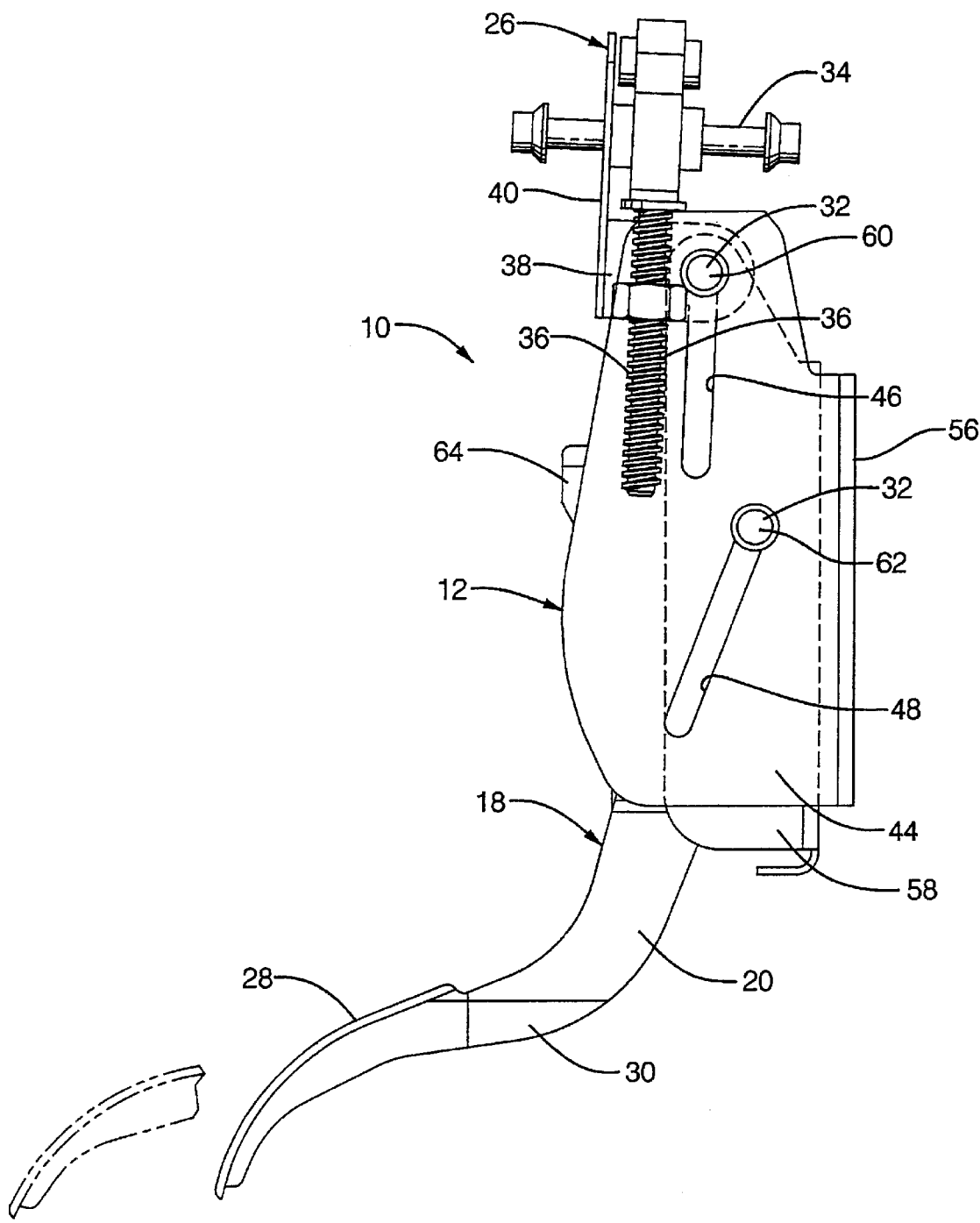
FIG. 4 is a side view of the embodiment shown in FIG. 3.

The slots 14, 16 are elongated straight slots, with the first slot 14 defining a first linear axis and the second slot 16 defining a second linear axis. The first slot 14 extends generally in a vertical direction, while the second slot 16 extends below the first slot and at an angle to the first slot whereby the first and second axes intersect. Examples of slot arrangements are shown in the Figures. The angles at which the slots are placed may be described in various ways. For example, it can be said that the second slot 16 extends back relative to the driver as it extends down. One possibility is shown in FIGS. 1 and 2. In this version, the second slot 16 is under and behind the first slot 14 relative to the vehicle. Another possibility is shown in FIGS. 3 and 4. In this version, the second slot 16 is under and partly in front of the first slot 14 relative to the vehicle. In both cases, the second slot 16 angles toward the pedal pad 28 that is disposed at the end of the elongated pedal arm 30. In all four of the figures, the pedal 20 is shown in the design position for the tallest drivers with the pin 22 at the top of the slot 14.

The pins 22, 24 may extend from or through the pedal 20. In the embodiment shown in FIGS. 1 and 2, each pin 22, 24 may extend through a hole (not shown) in the pedal 20. The ends of each pin 22, 24 will have some suitable retaining structure 32 for retaining the pin 22, 24 in the slot 14, 16. The structure may be a flange or a retaining clip of some sort. Various options are possible and readily available to persons of skill in the art.

The two-slot design provides for a wide range of pedal trajectories. In the case noted above where the two slots 14, 16 are straight, the pedal pad 28 will move in a shallow arc, with the pedal pad moving slightly downwardly as it moves back. The pedal pad 28 also tilts up as it moves back to optimize the ergonomics for shorter drivers. But one can achieve different desirable trajectories by manipulating the location of the slots 14, 16, the lengths of the slots, and the respective shapes of the slots.

For example, in an alternative embodiment (not shown), one of the slots 14, 16, is straight and one of the slots is curved. The curving slot is curved in order to refine the movement of the pedal pad 28 as it moves through its adjustment travel. Typically, the straight slot is the slot with which the linear actuator 26 is associated. Thus, one possible arrangement would involve the first slot being the straight slot and oriented in a vertical manner. The second slot could be curved slightly to effect a fairly linear trajectory for the pedal pad 28 as it moves through its adjustment travel.

Various actuators may be used to move the pedal assembly 18 along its adjustment travel relative to the support structure 12. As shown in FIGS. 1 and 2, for example, cable (not shown) extends through the hollow shaft 34 and rotates the shaft about its axis. Through an appropriate gear (not shown), this movement drives the jack screw 36, which causes the nut 38 to move the pin 22 up and down in the slot 14. Typically, the cable will drive the actuators associated with each of a brake, accelerator, and possibly a clutch pedal assembly, so that all three pedals move together in some predetermined relationship. One preferred actuator 26 is a conventional jack-screw type of actuator. As shown in the Figures, the actuator 26 is connected to a pin 22 riding in one of the slots. If one of the slots is curved, the actuator is preferably associated with the straight slot. The linear actuator 26 is supported on the support structure as shown with the bracket 40.

In a preferred construction, the support structure 12 has a first plate 42 defining the first and second slots 14, 16, and a second plate 44 that is disposed parallel to the first plate 42. The second plate 44 defines third and fourth slots 46, 48 arranged parallel to the first and second slots 14,16, respectively. The first and second plates 42, 44 are connected in some suitable manner. According to the embodiment shown in FIGS. 1 and 2, the plates 42, 44 are connected by a number of double-shouldered rivets. According to the embodiment shown in FIGS. 3 and 4, the plates 42, 44 are interconnected as shown to form a U-shaped bracket. This can be achieved by bending a single plate into the preferred shape, or by welding plates together.

The support structure 12 may be fixed to the vehicle in a pivoting arrangement, or in a purely static, non-pivoting arrangement—depending on what type of pedal is involved. In the typical case, the support structure 12 includes a pivoting attachment 50 adapted to attach to the vehicle whereby the support structure 12 may pivot with respect to the vehicle in response to operational forces applied to the pedal 20. This is the case where the pedal 20 is a brake pedal, clutch pedal, or conventional accelerator pedal. As shown in FIGS. 1 and 2, the first pin 22 extends through the first slot 14, through the pedal 20, and through the third slot 46. The second pin 24 extends through the second slot 16, through the pedal 20 and through the fourth slot 48. When the driver pushes on the pedal 20, the pedal 20 and the support structure 12 will move together by pivoting with respect to the vehicle. This is shown in FIGS. 1 and 2, where the support structure 12 and the pedal assembly 18 pivot about the pivot point 50. Spring attachment point 52 shows where a return spring may attach to the support structure 12 to pull the pedal assembly 18 and the support structure 12 back to a neutral position. Rod attachment point 54 shows where a rod or cable (not shown) may attach to the support structure 12 to transfer motion from the pedal 20.

In certain embodiments, the support structure 12 may include a fixed attachment adapted to attach to the vehicle whereby the support structure 12 does not move with respect to the vehicle when operational forces are applied to the pedal 20. In FIGS. 3 and 4, this fixed attachment is the attachment plate 56. This is most useful in a case where the pedal assembly 18 includes an electronic throttle control module. As illustrated in FIGS. 3 and 4, the pedal assembly 18 includes a bracket 58; and first, second, third, and fourth pins 22, 24, 60, 62 extending from the bracket 58, with one pin extending through each of the slots 14, 16, 46, 48. The elongated pedal 20 is pivotally connected to the bracket 58, with some suitable electronic throttle control module 64 being associated with the pedal 20. A spring (not shown) is typically disposed between the bracket 58 and the pedal 20 to control movement of the pedal.

In operation of either embodiment, a person may adjust the location of the pedal pad 28 by starting the actuator 26. This may be accomplished with a remote switch that turns the aforementioned cable. The cable drives the shaft 34, which in turn drives the screw 36. The movement of the screw 36 in turn moves the nut 38, which itself moves the pin 22 or 60. As the pin 22, 60 moves, it moves the pedal 20 down, which in turn moves the pedal pad 28 back and down slightly. The pedal pad 28 also tilts upwardly. If there are two or more pedals involved, they can all move together with some constant relative offset, if desired, to maintain them in a given relationship with respect to one another. For example, it is desirable to maintain the accelerator pedal at a position farther from the driver than the brake pedal. The actuators on the various pedal assemblies can be driven by the same cable.

We claim:

1. An adjustable pedal assembly for a vehicle comprising:
   a support structure adapted to connect to the vehicle, the support structure defining first and second slots arranged in a spaced-apart and non-parallel manner;
   a pedal assembly disposed adjacent the support structure, the pedal assembly including a pedal;
   first and second pins extending from spaced non-concentric locations of the pedal assembly through the first and second slots whereby the pedal assembly is supported for sliding movement on the support structure along the slots; and
   a linear actuator interconnected with the pedal assembly for sliding the pedal assembly to a desired position along the support structure.

2. The adjustable pedal assembly of claim 1 wherein the slots are elongated straight slots, with the first slot defining a first linear axis and the second slot defining a second linear axis that is non-parallel with respect to the first linear axis.

3. The adjustable pedal assembly of claim 1 wherein the linear actuator is interconnected with the support structure.

4. The adjustable pedal assembly of claim 1 wherein the linear actuator is interconnected with the first pin of the pedal.

5. The adjustable pedal assembly of claim 1 wherein one of the slots is straight and one of the slots is curved.

6. An adjustable pedal assembly for a vehicle comprising:
   a support structure adapted to connect to the vehicle, the support structure defining first and second slots arranged in a spaced-apart manner;
   a pedal assembly disposed adjacent the support structure, the pedal assembly including a pedal;
   first and second pins extending from the pedal assembly through the first and second slots whereby the pedal assembly is supported for sliding movement on the support structure along the slots; and a linear actuator interconnected with the pedal assembly for sliding the pedal assembly to a desired position along the support structure, the slots being elongated straight slots, with the first slot defining a first linear axis and the second slot defining a second linear axis, the first slot extending generally in a vertical direction, and the second slot extending below the first slot and at an angle to the first slot whereby the first and second axes intersect.

7. The adjustable pedal assembly of claim 6 wherein the pedal assembly includes a pedal arm extending away from the support structure, and a pedal pad disposed at the distal end of the pedal arm, the second slot angling toward the pedal pad.

8. An adjustable pedal assembly for a vehicle comprising:

a support structure adapted to connect to the vehicle, the support structure defining first and second slots arranged in a spaced-apart manner;

a pedal assembly disposed adjacent the support structure, the pedal assembly including a pedal;

first and second pins extending from the pedal assembly through the first and second slots whereby the pedal assembly is supported for sliding movement on the support structure along the slots; and a linear actuator interconnected with the pedal assembly for sliding the pedal assembly to a desired position along the support structure, the slots being elongated straight slots, with the first slot defining a first linear axis and the second slot defining a second linear axis, the first slot extending generally in a vertical direction, and the second slot extending below the first slot and at an angle to the first slot whereby the first and second axes intersect, the pedal assembly including a pedal arm extending away from the support structure, and a pedal pad disposed at the distal end of the pedal arm, the second slot angling toward the pedal pad, the support structure having a first plate defining the first and second slots, and a second plate that is disposed parallel to the first plate, the second plate defining third and fourth slots arranged parallel to the first and second slots, respectively.

9. The adjustable pedal assembly of claim 8 wherein the support structure includes a pivoting attachment adapted to attach to the vehicle whereby the support structure may pivot with respect to the vehicle in response to operational forces applied to the pedal.

10. The adjustable pedal assembly of claim 9 wherein the first pin extends through the first slot, through the pedal; and through the third slot; and the second pin extends through the second slot, through the pedal and through the, fourth slot.

11. The adjustable pedal assembly of claim 10 wherein the pedal assembly includes a bracket, first, second, third, and fourth pins extending from the bracket with one extending through each of the slots, and a pedal pivotally mounted on the bracket.

12. The adjustable pedal assembly of claim 11 further including an electronic throttle control module associated with the pedal.

13. The adjustable pedal assembly of claim 8 wherein the support structure includes a fixed attachment adapted to attach to the vehicle whereby the support structure does not move with respect to the vehicle when operational forces are applied to the pedal.

14. The adjustable pedal assembly of claim 8 wherein the first and second plates are spaced apart with a plurality of double-shouldered rivets.

* * * * *